United States Patent [19]

Main

[11] 4,128,153
[45] Dec. 5, 1978

[54] VISCOUS SHEAR FLUID COUPLINGS

[75] Inventor: Peter L. Main, Huddersfield, England

[73] Assignee: Holset Engineering Company Limited, Huddersfield, England

[21] Appl. No.: 794,696

[22] Filed: May 6, 1977

[30] Foreign Application Priority Data

May 11, 1976 [GB] United Kingdom ............... 19236/76

[51] Int. Cl.² .............................................. F16D 35/00
[52] U.S. Cl. ............................. 192/58 B; 192/113 B
[58] Field of Search ........................... 192/58 B, 113 B

[56] References Cited

U.S. PATENT DOCUMENTS

| Re. 25,481 | 11/1963 | Weir | 192/58 B |
|---|---|---|---|
| 2,743,792 | 5/1956 | Ransom | 192/58 B X |
| 3,002,595 | 10/1961 | Weir | 192/58 B |
| 3,559,785 | 2/1971 | Weir | 192/58 B |
| 3,696,899 | 10/1972 | Kongelka | 192/58 B |
| 3,910,391 | 10/1975 | Detty et al. | 192/58 B |
| 3,978,952 | 9/1976 | Hall | 192/58B |

*Primary Examiner*—Allan D. Herrmann
*Attorney, Agent, or Firm*—Gary M. Gron; Robert T. Ruff

[57] ABSTRACT

The disclosure illustrates a viscous shear fluid fan drive comprising a driving disc received within an annular chamber of an output member. The disc and the chamber include closely spaced radially extending surfaces which transmit torque through a viscous fluid maintained between them. Pumping grooves are provided in the disc to insure rapid build up of hydrodynamic lubrication upon startup of the coupling. Cavities may be provided in the walls of the chamber to receive additional viscous fluid and extend service life of the coupling.

4 Claims, 5 Drawing Figures

VISCOUS SHEAR FLUID COUPLINGS

The present invention relates to viscous shear fluid couplings. Viscous shear fluid couplings, e.g. for driving the cooling fan of a water cooled internal combustion engine have long been used to reduce parasitic engine losses and therefore increase efficiency. This type of viscous shear coupling generally includes an outer driven member closely surrounding an inner driving member with a viscous fluid in the space between the driven and driving members to establish a viscous shear driving relation between the two members. The shear surfaces of the two members provide the bearing means for the relative rotation of one member with respect to the other.

The torque required to drive a cooling fan increases as a squared function of input R.P.M. This coupling limits the torque required to drive a fan by permitting slippage when the torque transmitted exceeds a predetermined level. Since the need for the cooling fan air flow is diminished at higher R.P.M. because of vehicle motion, the unnecessary driving of the fan is avoided. As a result engine noise is decreased as well as fuel consumption.

Such fluid couplings have been found to have lubrication problems when operated in cold climates where temperatures at start-up may be of the order of −30° C. (−22° F.). The main problem is the difficulty in establishing hydrodynamic lubrication conditions between the shear surfaces at start-up when the silicone fluid normally used for the viscous shear fluid may have an apparent viscosity of approximately five times its nominal viscosity at normal ambient temperatures of 25° C. (77° F.).

Similar problems occur at start-up when such fluid couplings are operated in normal ambient temperatures, as may be found in the engine compartment of a motor vehicle in temperate climates, and are filled with a silicone fluid having a nominal viscosity at 25° C. (77° F.) equivalent to the high apparent viscosities found in normal drives in low cold climate temperatures.

When operated in low temperature, cold climate conditions, or in normal ambient temperature conditions when filled with high nominal viscosity fluid, such fluid coupings may exhibit unstable characteristics, give unpredictable performance and rapidly fail because of excessive and unacceptable wear of the shear surfaces, particularly the shear surfaces acting as thrust bearings.

Previously, attempts have been made to prolong the life of such fluid couplings by suitable choice of materials for the shear faces, which also act as bearing surfaces, of the outer driven member and inner driving member. Generally such materials have been chosen from the range of materials known to have good dry lubrication properties. Such solutions have only been partially successful and early failure of the fluid coupling has resulted where the length of time to achieve hydrodynamic lubrication conditions has been unduly prolonged.

It is an object of the present invention to improve the hydrodynamic lubricating conditions between the shear surfaces in a fluid coupling of the type initially described and thereby increase the operational life expectancy of the coupling compared with that of the hitherto known constructions.

In accordance with the present invention, there is provided a viscous shear fluid comprising a first annular rotatable member, a second rotatable member having an internal first annular chamber receiving said annular member, with radially extending surfaces of said chamber and opposing radially extending surfaces of said first member at least in part being in close-spaced relationship, viscous coupling fluid in said chamber for transmitting torque from one of the members as a driving member to the other member as a driven member upon rotation of the driving member, and at least one groove across each said radially extending surface of the driving member, the radially inner end leading the radially outer end of each groove in the direction of operational rotation of the driving member whereby to cause said viscous coupling fluid to be pumped towards the periphery of the driving member upon rotation of the said driving member in the latter direction.

It has been found that the provision of such grooves across the radially extending surfaces of the driving member substantially eliminates the above described problem and ensures that hydrodynamic lubrication is rapidly established.

It has also been found that the minimum quantity of fluid required to give stable and predictable operation is greatly reduced when the fluid coupling driving member is provided with such grooves. This reduction in minimum fluid content may, in some instances, be as great as 50%. Where such fluid couplings suffer a progressive loss of fluid during service as a result of leakage, the life of the fluid coupling is extended as the period of time taken for the quantity of fluid in the coupling to fall to a level where the coupling becomes inoperable is extended for any given application.

The life of the fluid coupling may be further extended by the inclusion of additional spaces or cavities located radially inwardly of the shear surfaces to provide fluid storage spaces or reservoirs for additional fluid thus further extending the period of time for the fluid quantity to fall to an unacceptably low level.

The above and other related features of the invention will be apparent from a reading of the following description of the disclosure shown in the accompanying drawings and the novelty thereof pointed out in the appended claims.

Figure 1:
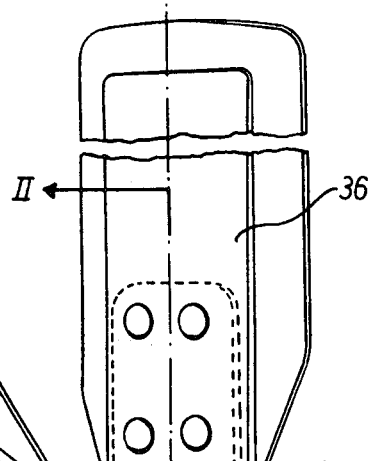
FIG. 1 is a partial front view of one embodiment of a coupling in accordance with the invention.
Figure 2:
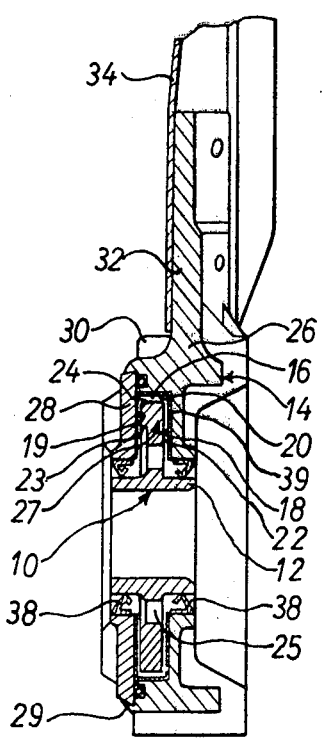
FIG. 2 is a section on line II—II of FIG. 1.
Figure 3:
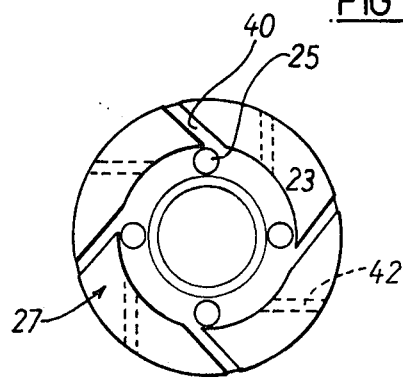
FIG. 3 is a front view of the driving member of the coupling of FIGS. 1 and 2.

Referring to FIGS. 1 to 3 of the drawings, the illustrated coupling comprises a cast iron driving member 10 coaxially mounted within a driven outer member 14 for rotation relative thereto. The driving member 10 includes a hub portion 12 for mounting on a drive shaft 13 to rotate with it. When the coupling is used on an internal combustion engine, the drive shaft 13 is driven from the engine, usually by mounting on the same shaft that drives the water pump for the engine. The driven member 14 which may be made of aluminum of die casting quality defines a chamber 16 having planar radially extending surfaces 18 and 19 and a circumferential surface 20 in close-spaced relationship with radially extending, generally planar surfaces 22 and 23 and a circumferential surface 24, respectively, of an annular disc-like portion 25 of the driving member 10.

To enable the driving member 10 to be inserted in the driven member 14, the driven member 14 is formed in two parts 26, 28 connected together in their assembled state by peening over at 29. The driven member is finned at 30 to assist heat dissipation and the part 26 of the driven member 14 includes integral fan spider arms 32, which also assist in the dissipation of heat. Attached to each spider arm is a respective fan blade 34 which includes a dished portion 36 to strengthen the blade. The surfaces 18 and 20 of the chamber 16 preferably are coated with a 0.0005 inch thick layer 39 of a polytetrafluoroethylene resin combination e.g. Xylan, the layer having been applied by a spray-coating process. A viscous coupling fluid 41 such as high viscosity silicone is contained in the chamber. Rotary shaft seals 38 are interposed between the hub portion 12 of the driving member 10 and the driven member 14.

The coupling so far described is of known construction. In operation the driving member 10, which is attached to the drive shaft 13, is rotated and this in turn rotates the driven member 14 through shear action in the viscous coupling fluid 41. A plurality of holes 25 (four in this embodiment) are provided in the driving member 10 to allow free communication of the coupling fluid to both sides of the driving member. There may, however, be a considerable degree of slip between the two members thereby generating heat.

In order to improve the rapidity with which hydrodynamic lubrication is established, one or more grooves 40,42 (four in this example) are formed in the radially extending side faces or surfaces 22 and 23 of the annular disc-like portion 25 of the driving member 10, the grooves being inclined in relation to the direction of rotation (shown as clockwise in FIG. 3) such that the radially inner end of each groove leads the radially outer end whereby fluid is pumped outwardly along these grooves towards the periphery of the driving member when the driving member is rotated. In the illustrated embodiment, each groove is rearwardly inclined at approximately 45° to a radial line passing through its radially innermost end. It is preferred for the grooves on each face of the driving member to be equally spaced and to be of equal number on both faces, although this is not essential. As shown in FIG. 3, the grooves on one face can be offset from those on the other face or the grooves on one face can lie directly over the grooves on the other face.

Figure 4:
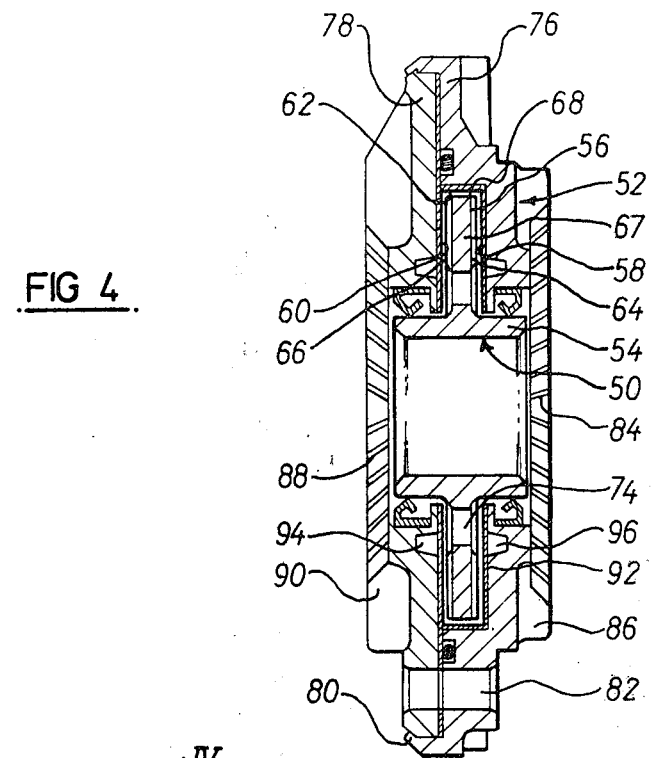
FIG. 4 is a sectional view through a second embodiment of a coupling in accordance with the invention, corresponding to a section on the line IV—IV of FIG. 5 but with both parts of the driven member present.
Figure 5:
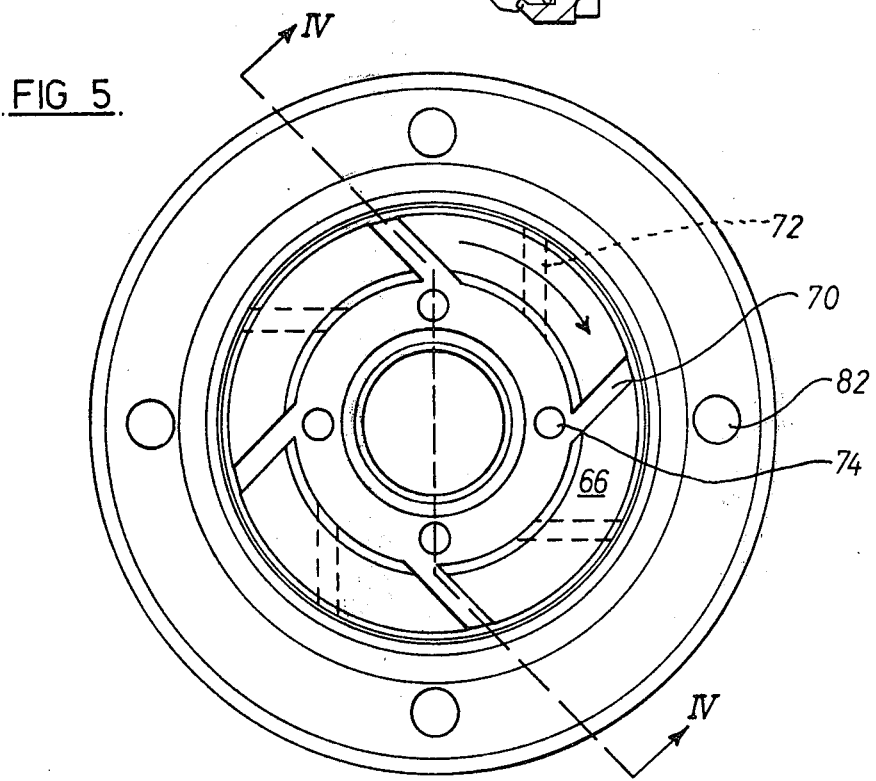
FIG. 5 is a front view of the second embodiment with one part of the driven member removed for clarity.

The embodiment illustrated in FIGS. 4 and 5 is basically the same as that of FIGS. 1 to 3 in that it comprises a cast iron driving member 50 coaxially mounted within a driven outer member 52 for rotation relative thereto. The driving member includes a hub portion 54 for mounting on a drive shaft (not shown) similar to shaft 13 for the FIGS. 1-3 embodiment. The driven member 52 which is made of aluminum defines a chamber 56 having a planar radially extending surfaces 58 and 60 and a circumferential surface 62 in close-spaced relationship with radially extending, generally planar surfaces 64 and 66 and a circumferential surface 68, respectively, of an annular disc-like portion 67 of the driving member 50. As in the first embodiment, a plurality of inclined grooves 70, 72 are formed in the two side faces of the portion 67 or the driving member, respectively, in a region radially outwardly of the through-holes 74 whereby to pump the viscous coupling fluid towards the periphery of the driving member 50 when the latter member is rotated in the direction of the arrow.

The driven member 52 is formed in two parts 76 and 78 connected together by peening over at 80. In contrast to the first embodiment, the second embodiment does not have an integrally formed spider for carrying the fan blades but rather is adapted to be connected to a conventional separate fan blade spider having a central annular boss. For this purpose, the driven member 52 has a number of through-holes 82 for receiving respective bolts (not shown) whereby the driven member can be attached to said annular boss.

The external surface of the part 76 of the driving member has fins 86 for cooling purposes and the part 78 has fins 90. As shown in FIG. 4, the surfaces defining the chamber 56 are again covered with a coating 92 of polytetrafluoroethylene.

Finally, the embodiment of FIGS. 4 and 5 include a pair of opposed annular cavities 94, 96, in facing walls of the driven member and at the radially inner end of the chamber 56 for providing fluid storage spaces or reservoirs for additional fluid, whereby to extend the time for the fluid quantity in the chamber 56 to fall by leakage to an unacceptably low level.

While preferred embodiments of the present invention have been discussed it will be apparent to those skilled in the art that alternate forms of the invention may be practiced without departing from its spirit and scope.

Having thus described the invention what is claimed as novel and desired to be secured by Letters Patent of the United States is:

1. A viscous shear fluid coupling comprising a first annular rotatable member, a second rotatable member having an internal annular chamber receiving said first annular member, said first and second annular members having opposed radially extending surfaces in close-spaced relationship, viscous coupling fluid in said chamber for transmitting torque from one member to the other member upon rotation of the one member as a driving member to rotate the other member as a driven member and at least one groove across each said radially extending surface of the driving member, the radially inner end leading the radially outer end of each groove in the direction of operational rotation of the driving member whereby to cause said viscous coupling fluid to be pumped only towards the periphery of the driving member upon rotation of the said driving member in the latter direction thereby coupling and journaling said driven and driving members relative to one another, said coupling having at least one cavity formed in at least one of said radially extending surfaces of the chamber to provide fluid storage reservoirs for said viscous coupling fluid, said coupling further comprising a layer of non-metallic anti-friction material on at least those parts of said radially extending surfaces of said annular chamber which are in close-spaced relationship with said radially extending surfaces on the driving member.

2. A coupling as claimed in claim 1 in which there are equal numbers of said grooves on both radially extending surfaces of the driving member.

3. A coupling as claimed in claim 2 in which the grooves in one radially extending surface of the driving member are offset from those on the other radially extending surface.

4. A coupling as claimed in claim 2 in which the grooves in one radially extending surface of the driving member directly overlie those on the other radially extending surface.

* * * * *